US012664009B2

(12) United States Patent
Nyamwange

(10) Patent No.: US 12,664,009 B2
(45) Date of Patent: Jun. 23, 2026

(54) DISTRIBUTED REGULATORY TANGLEGRAPH CONSORTIUM SYSTEM FOR EXECUTING PROCESSES IN A VIRTUAL COMPUTING ENVIRONMENT

(71) Applicant: Bank of America Corporation, Charlotte, NC (US)

(72) Inventor: Elvis Nyamwange, Little Elm, TX (US)

(73) Assignee: Bank of America Corporation, Charlotte, NC (US)

( * ) Notice: Subject to any disclaimer, the term of this patent is extended or adjusted under 35 U.S.C. 154(b) by 792 days.

(21) Appl. No.: 17/845,409

(22) Filed: Jun. 21, 2022

(65) Prior Publication Data

US 2023/0409359 A1    Dec. 21, 2023

(51) Int. Cl.
*G06F 9/455* (2018.01)

(52) U.S. Cl.
CPC .................................... *G06F 9/455* (2013.01)

(58) Field of Classification Search
None
See application file for complete search history.

(56) References Cited

U.S. PATENT DOCUMENTS

| | | | |
|---|---|---|---|
| 9,392,022 B2 | 7/2016 | Frascadore et al. | |
| 10,482,664 B1 | 11/2019 | Schlosser et al. | |
| 11,270,509 B2 | 3/2022 | Saravanan et al. | |
| 11,983,212 B2 * | 5/2024 | Clark | G06Q 10/06393 |
| 2021/0042830 A1 * | 2/2021 | Burke | G06Q 30/0277 |
| 2022/0058648 A1 * | 2/2022 | Mahalle | G06F 21/32 |

* cited by examiner

*Primary Examiner* — Christopher Bridges
(74) *Attorney, Agent, or Firm* — Banner & Witcoff, Ltd.

(57) ABSTRACT

Aspects of the disclosure relate to a distributed regulatory tanglegraph consortium system for executing processes in a virtual computing environment. A computing platform may receive a rule from a rulemaking body. The computing platform may parse the rule to identify a virtual computing environment service and/or virtual computing environment product that the rule may affect. The computing platform may separate the rules into groups, wherein each group may correspond to a different virtual computing environment service and/or virtual computing environment product. If the computing platform determines the rule may be non-essential to virtual computing environment transactions, the computing platform might not process the rule. If the computing platform determines the rule may be essential to virtual computing environment transactions, the computing platform may transmit the rules to a device associated with the virtual computing environment service and/or virtual computing environment product that the rule may affect.

14 Claims, 8 Drawing Sheets

100

DISTRIBUTED REGULATORY TANGLEGRAPH CONSORTIUM SYSTEM FOR EXECUTING PROCESSES IN A VIRTUAL COMPUTING ENVIRONMENT

BACKGROUND

Aspects of the disclosure relate to hardware and/or software for a distributed regulatory tanglegraph consortium system for executing processes in a virtual computing environment. In particular, one or more aspects of the disclosure relate to processing rules and regulations using an importance value and a plurality of tanglegraphs, generating blocks using a plurality of rules, identifying at least one virtual computing environment service that corresponds to the rules and blocks, and transmitting the rules and blocks to a computing device associated with the corresponding virtual computing environment service.

In recent years, virtual computing environments (e.g., a metaverse) have undergone real-world modeling by way of considerable technological advancements and developments. One example of such real-world modeling is that the services and products that may be offered for sale in the physical world may be reduced to virtual renderings, and the virtual renderings may be offered for sale in the virtual computing environment. Since the virtual renderings mirror the structure, characteristics, and procedures that accompany the services and products in the physical world, the virtual renderings may also abide by the rules and regulations that surround the same services and products in the physical world. Current virtual computing environment protocols may allow virtual computing environment services and virtual computing environment products to be programmed in accordance with the rules and regulations that surround the same services and products in the physical world, but current virtual computing environment protocols might not offer the virtual computing environment the opportunity to implement, in real-time or near real-time, changes to the rules and regulations that may be implemented in real-time, or near real-time, in the physical world. Therefore, current virtual computing environment protocols fail to offer a method of updating, in real-time or near real-time, virtual computing environment services and virtual computing environment products with new and/or changing rules and regulations that may apply to the same services and products in the physical world.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, and convenient technical solutions that address and overcome the technical problems associated with maintaining and updating regulatory rules and/or requirements in a virtual computing environment.

In accordance with one or more embodiments, a method may comprise, at a computing device including at least one processor and memory, receiving, by the at least one processor, a rule associated with a virtual computing environment service. The method may comprise determining, by the at least one processor, an importance value associated with the rule. The method may comprise processing, by the at least one processing and using a tanglegraph, the rule based on the importance value associated with the rule. The method may comprise based on the determining the rule is associated with a first importance value range, generating, by the at least one processor, a block wherein the block is comprised of a plurality of rules. The method may comprise transmitting, by the at least one processor, the block to a node that corresponds to the virtual computing environment service. The method may comprise assigning, by the at least one processor, a unique key to the block. The method may comprise establishing, by the at least one processor, a connection with a virtual computing environment service device. The method may comprise matching, by the at least one processor, the unique key associated with the block to the corresponding key associated with the virtual computing environment service device. The method may comprise transmitting, based on the matching and using the connection, the block to the virtual computing environment service device.

In accordance with one or more embodiments, a computing platform may comprise a processor, a communication interface communicatively coupled to the at least one processor, and memory storing computer-readable instructions that, when executed by the at least one processor, cause the computing platform to receive a rule associated with a virtual computing environment service. The computing platform may determine an importance value associated with the rule. The computing platform may process, using a tanglegraph, the rule based on the importance value associated with the rule. The computing platform may, based on the determining the rule is associated with a first importance value range, generate a block wherein the block is comprised of a plurality of rules. The computing platform may transmit the block to a node that corresponds to the virtual computing environment service. The computing platform may assign a unique key to the block. The computing platform may establish a connection with a virtual computing environment service device. The computing platform may match the unique key associated with the block to a corresponding key associated with the virtual computing environment service device. The computing platform may transmit, based on the matching and using the connection, the block to the virtual computing environment service device.

In accordance with one or more embodiments, one or more non-transitory computer-readable media storing instructions that, when executed by a computing platform comprising at least one processor, memory, and a communication interface, cause the computing platform to receive a rule associated with a virtual computing environment service. The instructions, when executed, may cause the computing platform to determine an importance value associated with the rule. The instructions, when executed, may cause the computing platform to process, using a tanglegraph, the rule based on the importance value associated with the rule. The instructions, when executed, may cause the computing platform to, based on the determining the rule is associated with a first importance value range, generate a block wherein the block is comprised of a plurality of rules. The instructions, when executed, may cause the computing platform to transmit the block to a node that corresponds to the virtual computing environment service. The instructions, when executed, may cause the computing platform to assign a unique key to the block. The instructions, when executed, may cause the computing platform to establish a connection with a virtual computing environment service device. The instructions, when executed, may cause the computing platform to match the unique key associated with the block to a corresponding key associated with the virtual computing environment service device. The instructions, when executed, may cause the computing platform to transmit, based on the matching and using the connection, the block to the virtual computing environment service device.

These features, along with many others, are discussed in greater detail below.

BRIEF DESCRIPTION OF THE DRAWINGS

The present disclosure is illustrated by way of example and is not limited in the accompanying figures in which like reference numerals indicate similar elements and in which.

DETAILED DESCRIPTION

Figure 1A:
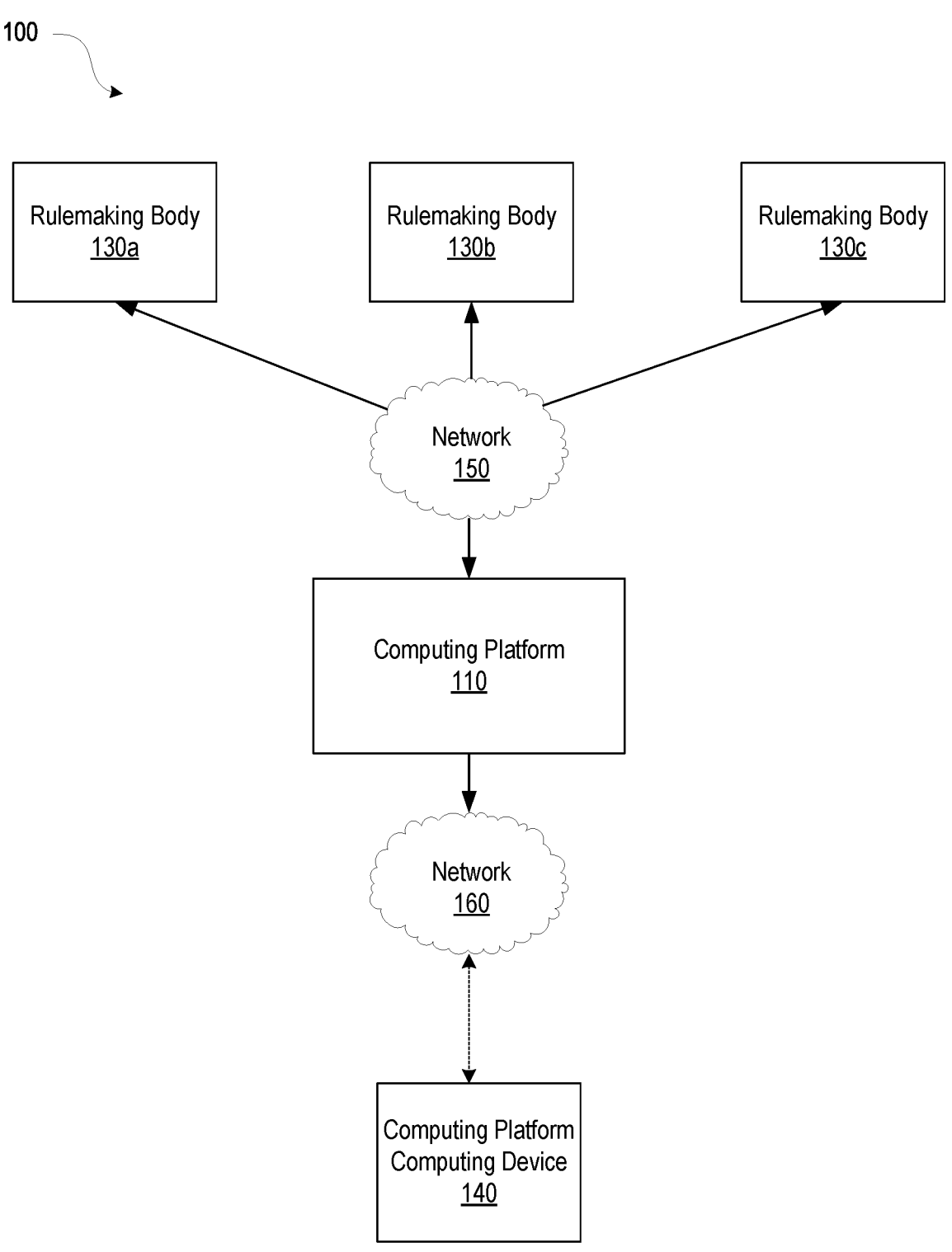
FIG. 1A depicts an illustrative example of a computing environment that may be used in a distributed regulatory tanglegraph consortium system for executing processes in a virtual computing environment, in accordance with one or more example embodiments.

In the following description of various illustrative embodiments, reference is made to the accompanying drawings, which form a part hereof, and in which are shown, by way of illustration, various embodiments in which aspects of the disclosure may be practiced. It is to be understood that other embodiments may be utilized, and structural and functional modifications may be made, without departing from the scope of the present disclosure. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As discussed above, current virtual computing environment protocols fail to offer a method of updating, in real-time or near real-time, virtual computing environment services and virtual computing environment products with new and/or changing rules and/or regulations that may apply to the same services and/or products in the physical world. Accordingly, proposed herein is a solution to the problem described above that includes a distributed regulatory tanglegraph consortium system for executing processes in a virtual computing environment. A rulemaking body (e.g., a government body, a regulation agency, a financial institution, or the like) may generate (e.g., draft, revise, update, or the like) a rule and/or a regulation that may affect a service and/or a product that may be offered for sale in the physical world. The rulemaking body may transmit the rule and/or regulation to a computing platform. The computing platform may parse the rule and/or regulation to identify a virtual computing environment service and/or a virtual computing environment product that the rule and/or regulation may affect. The computing platform may determine whether the rule and/or regulation is essential for completing transactions within the virtual computing environment (e.g., to perform a virtual computing environment service, to purchase a virtual computing environment product, or the like).

The computing platform may assign an importance value to the rule and/or regulation based on whether the rule and/or regulation is essential or non-essential to complete transactions in the virtual computing environment. The computing platform may group the rules and/or regulations that may be essential to complete transactions in the virtual computing environment into a block. The computing platform may identify the virtual computing environment service and/or the virtual computing environment product to which the block of rules and/or regulations may correspond. The computing platform may assign a unique key to the block. The computing platform may match the unique key associated with the block to a corresponding key associated with the virtual computing environment service and/or virtual computing environment product to which the block corresponds. Based on determining the unique key associated with the block matches a corresponding key associated with a virtual computing environment service and/or a virtual computing environment product, the computing platform may transmit the block to a device that may be associated with the virtual computing environment service and/or virtual computing environment product. The device that may be associated with the virtual computing environment service and/or virtual computing environment product may store the rules and/or regulations that may be in the block and may implement the rules and/or regulations in future transactions pertaining to the virtual computing environment service and/or the virtual computing environment product.

In some example, the computing platform may comprise the websocket application programming interface (API), the plurality of tanglegraphs, the platform bank, the plurality of nodes, the interference interface platform layer, the virtual computing environment, and/or the distributed ledger.

The rulemaking body may generate a rule and/or a regulation that may affect a service and/or a product within the virtual computing environment. The rulemaking body may transmit the rule and/or regulation to the computing platform. The computing platform may parse the rule and/or regulation to identify a virtual computing environment service and/or a virtual computing environment product to which the rule and/or regulation may correspond. The computing platform may investigate procedures that may be associated with the virtual computing environment service and/or the virtual computing environment product that the rule and/or regulation may correspond to, and may determine whether the rule and/or regulation may be essential for completing a transaction in the virtual computing environment.

If the computing platform determines that the rule and/or regulation may be essential or have at least a first threshold level of importance for completing transactions within the virtual computing environment, then the computing platform may assign the rule and/or regulation an importance value within a first importance value range (e.g., an importance value that may be greater than a threshold importance value that may be determined by the computing platform). Alternatively, if the computing platform determines that the rule and/or regulation might not be essential or has less than a threshold level of importance for completing transactions within the virtual computing environment (e.g., may be non-essential), then the computing platform may assign the rule and/or regulation an importance value within a second importance value range to the rule and/or regulation (e.g., an importance value that may be less than the threshold importance value that may be determined by the computing platform). A tanglegraph, of the plurality of tanglegraphs, may analyze the rule and/or regulation to determine whether the rule and/or regulation may be associated with the first importance value range. If the tanglegraph determines that the rule and/or regulation may be associated with the first importance value range, then the tanglegraph may transmit the rule and/or regulation to the platform bank. Alternatively, if the tanglegraph determines that the rule and/or regulation might not be associated with the first importance value range (e.g., may be associated with the second importance value range), then the tanglegraph may store the rule and/or regulation and the associated importance value in the distributed ledger. In some instances, the computing platform may further investigate transactional procedures surrounding the virtual computing environment service and/or the virtual computing environment product that the rule and/or regulation may affect to determine whether the importance value associated with the rule and/or regulation may have changed (e.g., may have increased such that the importance value associated with the rule and/or regulation may be within the first importance value range).

The platform bank may parse the rule and/or regulation to identify the virtual computing environment service and/or virtual computing environment product that the rule and/or regulation may affect. The platform bank may determine whether a number of rules and/or regulations that correspond to a particular virtual computing environment service and/or virtual computing environment product corresponds to (e.g., matches, is the same as, or the like) a number of tanglegraphs. If the platform bank determines that the number of rules and/or regulations that correspond to a particular virtual computing environment service and/or virtual computing environment product may be less than the number of tanglegraphs, then the platform bank may store the rules and/or regulations associated with the virtual computing environment service and/or virtual computing environment product (e.g., until additional rules associated with the virtual computing environment service and/or virtual computing environment product may be received). Alternatively, if the platform bank determines that the number of rules and/or regulations that correspond to a particular virtual computing environment service and/or virtual computing environment product is equal to the number of tanglegraphs, then the platform bank may group the rules and/or regulations associated with the virtual computing environment service and/or virtual computing environment product into a block. In some instances, the platform bank may determine that the number of rules and/or regulations that correspond to a particular virtual computing environment service and/or virtual computing environment product may be greater than the number of tanglegraphs. In such instances, the platform bank may generate a plurality of blocks, wherein the number of rules and/or regulations within each block may correspond to (e.g., match, be the same as, or the like) the number of tanglegraphs.

The platform bank may transmit the blocks to a node, of the plurality of nodes, that may correspond to the virtual computing environment service and/or virtual computing environment product that the rules and/or regulations may affect. The node may assign a unique key to each block. The node may transmit the blocks and the unique keys to the interference interface platform layer. The interference interface platform layer may parse the unique key associated with each block and may identify a virtual computing environment service and/or product associated with a corresponding key. The interference interface platform layer may establish a connection with a device that may be associated with the virtual computing environment (e.g., using a websocket API). The interference interface platform layer may transmit the blocks to the device associated with the virtual computing environment service and/or product based on matching the unique key associated with the block matching the corresponding key associated with the virtual computing environment service and/or product. The computing platform may store the unique key associated with the block and the corresponding key associated with the virtual computing environment service or product in the distributed ledger. The device associated with the virtual computing environment service and/or virtual computing environment product may receive the block and may implement the rules and/or regulations in future transactions within the virtual computing environment.

Computer Architecture

FIG. 1A depicts an illustrative example of computing environment 100 that may be used in a distributed regulatory tanglegraph consortium system for executing processes in a virtual computing environment, in accordance with the features described herein. Computing environment 100 may comprise computing platform 110, rulemaking bodies 130a-130c, computing platform computing device 140, network 150, and network 160. While FIG. 1A depicts one computing platform computing device (e.g. computing platform computing device 140), more than one computing platform computing device may be configured to interact with computing platform 110. In some arrangements, computing environment 100 may include additional computing devices that are not depicted in FIG. 1A, which may also be configured to interact with computing platform 110.

While FIG. 1A depicts more than rulemaking body (e.g., rulemaking bodies 130a-130c), each of rulemaking bodies 130a-130c may be configured in accordance with the features described herein. While the description herein may refer to rulemaking body 130, it is important to note that the functions described in connection with rulemaking body 130 may also be performed by any one of rulemaking bodies 130a-130c. Each one of rulemaking bodies 130a-130c may be configured to communicate with computing platform 110 through network 150. In some arrangements, computing environment 100 may include additional rulemaking bodies that are not depicted in FIG. 1A, which may also be configured to interact with computing platform 110.

Rulemaking body 130 may be associated with an entity that may generate (e.g., draft, modify, revise, update, repeal, or the like) rules and/or regulations that may affect an industry. For example, rulemaking body 130 may correspond to a company, school, government agency, or the like. Rulemaking body 130 may monitor a particular industry (e.g., a financial industry, an automotive industry, a factory industry, or the like) to track current rules and/or regulations that may influence (e.g., control, govern, or the like) transactions within the particular industry. For example, rulemaking body 130 may correspond to the financial industry and may monitor the current rules and/or regulations that may control loan applications, mortgage refinancing applications, property acquisition applications, or the like.

In some instances, rulemaking body 130 may monitor an overall atmosphere within an industry to detect when the industry may encounter (or may have encountered) at least one change (e.g., transitioning to cloud computing, removing physical files, streamlining a loan application process, or the like). As such, rulemaking body 130 may respond to the at least one change through the creation of new rules and/or regulations that may address the at least one change. For example, rulemaking body 130 may correspond to the financial industry and may determine that the financial industry may modify the current loan application process (e.g., a new loan application process may require three forms of identification, whereas the previous loan application process may have required a single form of identification). In such instances, rulemaking body 130 may investigate the change in identification requirements and may generate rules and/or regulations that may provide information, assistance, and/or recommendations on the new loan application process (e.g., information on the forms of identification that may be accepted in the new loan application process, assistance on how to access additional forms of identification, recommendations on the forms of identification that may be the most convenient for verification, or the like). Rulemaking body 130 may transmit the generated rules and/or regulations to computing platform 110 across network 150.

Network 150 may include one or more sub-networks (e.g., local area networks (LANs), wide area networks (WANs), or the like). Furthermore, computing environment 100 may include a local network configured to interconnect each of the computing devices comprising computing platform 110.

As discussed in detail in connection with FIG. 1B, computing platform 110 may comprise websocket API 111, tanglegraphs 112a-112c, platform bank 113, nodes 114a-114c, interference interface platform layer 115, virtual computing environment 116, virtual computing environment services 116a-116c, virtual computing environment products 116d-116f, distributed ledger 117, database 118, and processor(s) 119. Computing platform 110 may contain database 118 and processor(s) 119, which may be stored in the memory of the one or more computing device(s) of computing platform 110. Computing platform 110 may be associated with a distinct entity such as a company, school, government, or the like, and may comprise one or more personal computer(s), server computer(s), hand-held or laptop device(s), multiprocessor system(s), microprocessor-based system(s), set top box(es), programmable client electronic device(s), network personal computer(s) (PC), minicomputer(s), mainframe computer(s), distributed computing environment(s), or the like. Computing platform 110 may include computing hardware and/or software that may host various data and applications for performing tasks of the centralized entity and interacting with computing devices.

In some arrangements, computing platform 110 may include and/or be part of enterprise information technology infrastructure and may host a plurality of enterprise applications, enterprise databases, and/or other enterprise resources. Such applications may be executed on one or more computing devices included in computing platform

110 using distributed computing technology or the like. In some instances, computing platform 110 may include a relatively large number of servers that may support operations of an enterprise organization, such as a financial institution.

Network 160 may include one or more sub-networks (e.g., local area networks (LANs), wide area networks (WANs), or the like). Furthermore, computing environment 100 may include a local network configured to interconnect each of the computing devices comprising computing platform 110.

Figure 1B:
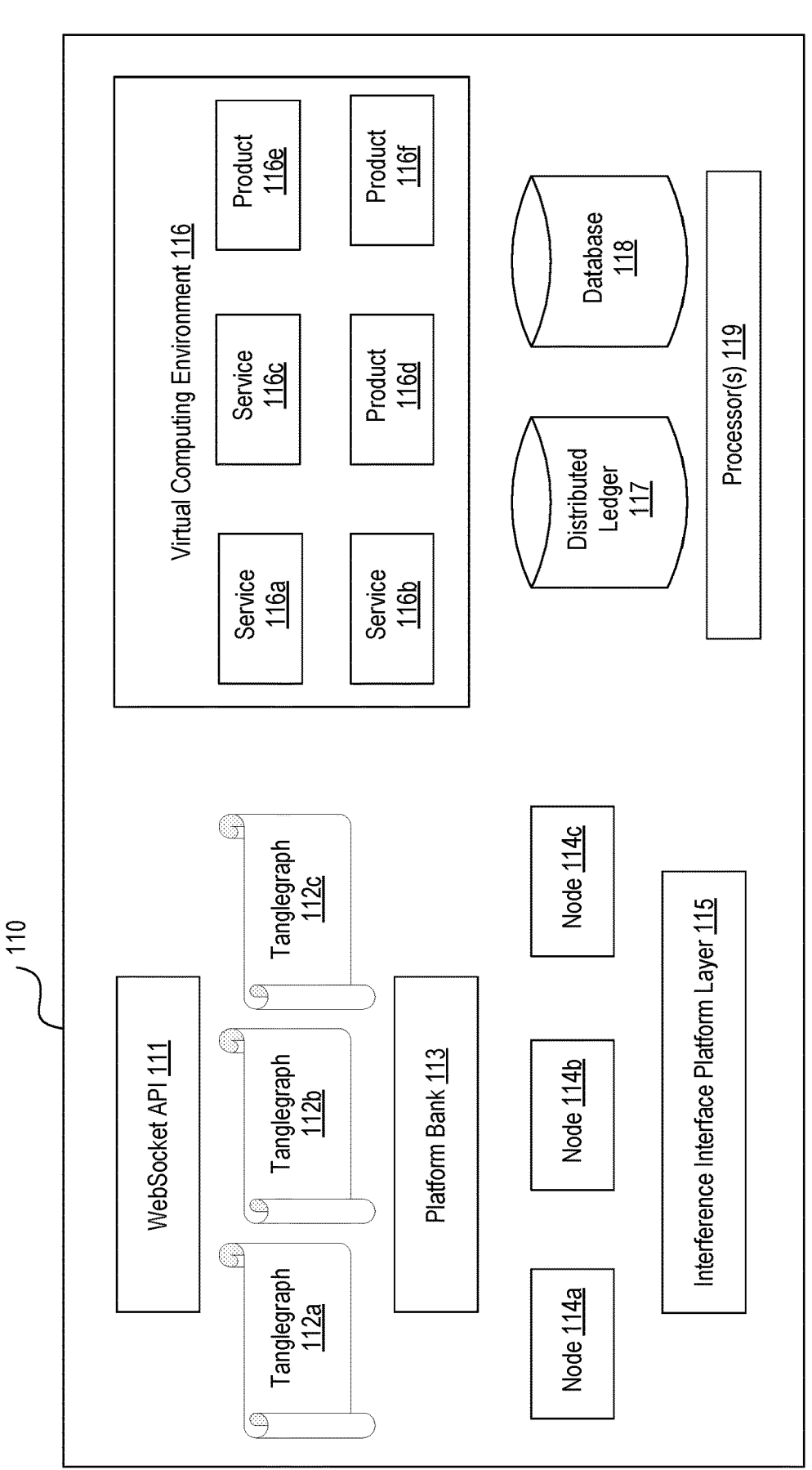
FIG. 1B depicts an illustrative example of the computing platform that may be used in a distributed regulatory tanglegraph consortium system for executing processes in a virtual computing environment, in accordance with one or more example embodiments.

FIG. 1B depicts an illustrative example of computing platform 110 that may be used in a distributed regulatory tanglegraph consortium system for executing processes in a virtual computing environment, in accordance with the features described herein. As described above, computing platform 110 may comprise websocket API 111, tanglegraphs 112a-112c, platform bank 113, nodes 114a-114c, interference interface platform layer 115, virtual computing environment 116, virtual computing environment services 116a-116c, virtual computing environment products 116d-116f, distributed ledger 117, database 118, and processor(s) 119. A data bus processor may interconnect the components of computing platform 110. One or more program units having instructions that, when executed by processor(s) 119, may cause computing platform 110 to perform one or more functions described herein and/or may cause one or more databases (e.g., distributed ledger 117, database 118, or the like) to store and/or otherwise maintain information which may be used by such program units and/or processor(s) 119.

Computing platform 110 may receive at least one rule and/or regulation from rulemaking body 130. Computing platform 110 may parse the at least one rule and/or regulation using at least one natural language processing (NLP) algorithm (e.g., a supervised machine learning model that may be configured to perform text classification) to identify at least one industry associated with the at least one rule and/or regulation. For example, the at least one NLP algorithm may be configured to identify and extract words, terms, and/or phrases that may identify an industry (e.g., "automotive vehicle" may indicate the automotive industry, "loan application" may indicate the financial industry, or the like). Computing platform 110 may match the industry identified by the at least one NLP algorithm to a corresponding tanglegraph. Computing platform 110 may transmit the at least one rule and/or regulation to the tanglegraph that may correspond to the industry identified by the at least one NLP algorithm.

Computing platform 110 may further parse the at least one rule and/or regulation using at least one natural language processing (NLP) algorithm (e.g., a supervised machine learning model that may be configured to perform text classification) to identify a virtual computing environment service and/or virtual computing environment product that may correspond to the at least one rule and/or regulation. For example, the at least one NLP algorithm may identify words and/or terms that may indicate an objective (e.g., a goal, a mission, or the like) of the at least one rule and/or regulation (e.g., "three forms of identification are needed for loan application verification" may indicate that the at least one rule and/or regulation may be associated with a virtual computing environment loan application service, "mortgage refinancing options" may indicate that the at least one rule and/or regulation may be associated with a virtual computing environment mortgage repayment service, or the like).

Computing platform 110 may monitor (e.g., investigate, research, or the like) procedures that may be executed when completing a transaction with the virtual computing environment service and/or the virtual computing environment product to which the rule and/or regulation may correspond (e.g., transactional procedures). Computing platform 110 may determine whether the rule and/or regulation may be essential for completing the transaction in the virtual computing environment. The rule and/or regulation may be essential for completing the transaction in the virtual computing environment if the rule and/or regulation indicates at least one action and/or item that may be required to successfully complete the transaction. For example, the rule and/or regulation may indicate that a loan application might not be processed if less than three forms of identification are submitted alongside a completed loan application. Computing platform 110 may determine that the three forms of identification may be required for submitting the loan application and, as such, may determine that the rule and/or regulation addressing the loan application may be essential or meet at least the first threshold level of importance. On the other hand, the rule and/or regulation might not be essential (e.g., may be non-essential) or might not meet at least the first threshold level of importance for completing the transaction in the virtual computing environment if the rule and/or regulation identifies a plurality of options for successfully completing the transaction. For example, the rule and/or regulation may indicate that a form of identification may include a driver's license, a valid passport, a birth certificate, or the like. Computing platform 110 may determine that any one of the forms of identification may be accepted while completing a transaction within the virtual computing environment and, as such, may determine that the rule and/or regulation addressing the different forms of identification might not be essential (e.g., may be non-essential).

If computing platform 110 determines that the at least one rule and/or regulation may be essential or meet at least the first threshold level of importance for completing transactions within the virtual computing environment, then computing platform 110 may assign the at least one rule and/or regulation an importance value within a first importance value range (e.g., an importance value that may be greater than a threshold importance value that may be determined by the computing platform). For example, the computing platform may establish a threshold importance value of 65%, wherein the maximum importance value may be 100%. As such, rules and/or regulations that computing platform 110 may deem essential may be associated with an importance value equal to or greater than 65%.

Alternatively, if computing platform 110 determines that the at least one rule and/or regulation might not be essential or might not meet at least the first threshold level of importance for completing transactions within the virtual computing environment (e.g., may be non-essential), then computing platform 110 may assign the at least one rule and/or regulation an importance value within a second importance value range (e.g., an importance value that may be less than the threshold importance value that may be determined by the computing platform). For example, the computing platform may establish a threshold importance value of 65%, wherein the minimum importance value may be 10%. As such, rules and/or regulations that computing platform 110 might not deem essential (e.g., may be non-essential) may be associated with an importance value less than 65%.

As illustrated in FIG. 1B, computing platform 110 may further comprise websocket API 111. Websocket API 111 may be used, by a computing device associated with computing platform 110, to establish a connection with virtual computing environment 116. To establish a connection with virtual computing environment 116, computing platform 110 may use a computing device (e.g., computing platform computing device 140) to access a web browser. Computing platform computing device 140 may launch the web browser and may transmit a blank file (e.g., a blank HTML file). Computing platform computing device 140 may launch websocket API 111 to transmit a request to connect to virtual computing environment 116. To do so, computing platform computing device 140, may use websocket API 111 to indicate a location associated with virtual computing environment 116 (e.g., an IP address of a server that may host virtual computing environment 116, an IP address of a computing device that may host a virtualization server that may connect to virtual computing environment 116, or the like). Websocket API 111 may use the location to locate a computing device (e.g., a host server) that may provide a connection to virtual computing environment 116. Computing platform computing device 140 may transmit, to the host server, a request to access virtual computing environment 116.

In some instances, computing platform computing device 140 may run (e.g., host, support, or the like) at least one additional computing device (e.g., a virtualization server). In such instances, computing platform computing device 140 may connect directly to the virtualization server to access virtual computing environment 116. As such, computing platform computing 140 might not launch websocket API 111 to locate and to retrieve the location of virtual computing environment 116.

Computing platform 110 may further comprise a plurality of tanglegraphs (e.g., tanglegraphs 112a-112c, referred to herein as "tanglegraph 112"). Tanglegraph 112 may be a lightweight data structure that may be used to process and sort data in accordance with parameters that may be defined by the computing platform. While FIG. 1B depicts three tanglegraphs, more or less than three tanglegraphs may exist within computing platform 110. A number of tanglegraphs within computing platform 110 may correspond to (e.g., match, be the same as) a number of rulemaking bodies. A single tanglegraph, of the plurality of tanglegraphs, may correspond to a single rulemaking body, of the plurality of rulemaking bodies. For example, if a computing environment is comprised of five rulemaking bodies, then the computing environment may also comprise five tanglegraphs, wherein each tanglegraph may correspond to a single rulemaking body.

Tanglegraph 112 may receive, from computing platform 110, the at least one rule and/or regulation generated by rulemaking body 130 (e.g., the rulemaking body that corresponds to the tanglegraph). Tanglegraph 112 may store the at least one rule and/or regulation in distributed ledger 117. Tanglegraph 112 may analyze the at least one rule and/or regulation to determine whether the at least one rule and/or regulation may be associated with an importance value within the first importance value range or an importance value within the second importance value range (e.g., determine whether the at least one rule and/or regulation may be essential or may be non-essential based on the importance value associated with the at least one rule and/or regulation).

If tanglegraph 112 determines that the at least one rule and/or regulation may be essential or meet at least the first threshold level of importance (e.g., may be associated with an importance value within the first importance value range), then tanglegraph 112 may transmit the rule to platform bank 113. Alternatively, if tanglegraph 112 determines that the at least one rule and/or regulation might not be essential or might not meet at least the first threshold level of importance (e.g., may be associated with an importance value within the second importance value range), then tanglegraph 112 may indicate, in distributed ledger 117, that the at least one rule and/or regulation might not be transmitted to platform bank 113 for further processing.

In some instances, if tanglegraph 112 determines that the at least one rule and/or regulation might not be essential or might not meet at least the first threshold level of importance, tanglegraph 112 may instruct computing platform 110 to further investigate (e.g., evaluate) the at least one rule and/or regulation. Computing platform 110 may further investigate (e.g., monitor, research, or the like) the transactional procedures that may be associated with the virtual computing environment service and/or the virtual computing environment product to which the rule and/or regulation may correspond. Computing platform 110 may determine whether the transactional procedures that may be associated with the virtual computing environment service and/or virtual computing environment product may have changed (e.g., whether updated transactional procedures indicate that the at least one rule and/or regulation that may have previously been non-essential or not met at least the first threshold level of importance for completing transactions in the virtual computing environment may now be essential or do meet at least the first threshold level of importance for completing transactions in the virtual computing environment). Computing platform 110 may adjust (e.g., increase, decrease) the importance value associated with the at least one rule and/or regulation. In some instances, computing platform 110 may monitor a node associated with the virtual computing environment service and/or virtual computing environment product to observe whether the virtual computing environment service and/or virtual computing environment product may implement the at least one rule and/or regulation when completing transactions in the virtual computing environment. If computing platform 110 determines that the node associated with the virtual computing environment service and/or virtual computing environment product may implement (or might not implement) the at least one rule and/or regulation, then computing platform 110 may adjust (e.g., increase, decrease) the importance value associated with the at least one rule and/or regulation.

Platform bank 113 may be configured to generate blocks, wherein each block may contain the at least one rule and/or regulation. Platform bank 113 may be configured to transmit the blocks to a node that may correspond to the virtual computing environment service and/or virtual computing environment product that the at least one rule and/or regulation may affect. To do so, platform bank 113 may receive, from tanglegraph 112, the at least one rule and/or regulation. Platform bank 113 may parse the at least one rule and/or regulation to identify the virtual computing environment service and/or virtual computing environment product that the at least one rule and/or regulation may affect. Platform bank 113 may use at least one NLP algorithm (e.g., a supervised machine learning model that may be configured to perform text classification) to identify at least one virtual computing environment service and/or virtual computing environment product associated with the at least one rule and/or regulation. For example, the at least one NLP algorithm may be configured to identify words and/or terms that may indicate a virtual computing environment service and/or virtual computing environment product (e.g., "three forms of identification are needed for loan application verification" may indicate that the at least one rule and/or regulation may be associated with a virtual computing environment loan application service).

Platform bank 113 may group the rules and/or regulations based on the virtual computing environment service and/or virtual computing environment product that each rule and/or regulation may affect. For example, the rules and/or regulations that may affect the virtual computing environment loan application service may be grouped separately from the rules and/or regulations that may affect the virtual computing environment mortgage repayment service. Platform bank 113 may access each group of rules and/or regulations to generate the blocks.

Platform bank 113 may determine a number of rules and/or regulations that may be stored within each block based on block generation preferences that may be established by the computing platform. The computing platform may determine a minimum and a maximum number of rules and/or regulations that may be stored within each block. In some instances, the computing platform may determine the minimum or the maximum number of rules and/or regulations that may be within the block based on the number of tanglegraphs within computing platform 110. For example, if five tanglegraphs exist within computing platform 110, then computing platform 110 may determine that each block may comprise a maximum of five rules and/or regulations. In some instances, the computing platform may determine that the minimum and/or the maximum number of rules and/or regulations within the block might not be based on the number of tanglegraphs within computing platform 110, but may be based on the computing platform's preferences. In some instances, the computing platform's preferences may indicate that rules and/or regulations that may be associated with at least a particular importance value (e.g., an importance value of 90% or greater) may be processed by platform bank 113 without satisfying the minimum number of rules and/or regulations in the block.

If platform bank 113 determines that the number of rules and/or regulations in a group (e.g., a group associated with the virtual computing environment mortgage repayment service) might not meet the minimum number of rules and/or regulations that may be in the block, then platform bank 113 might not process the block (e.g., until additional rules and/or regulations associated with the virtual computing environment service and/or virtual computing environment product are received, until the additional rules and/or regulations are added to the group, or the like). In some instances, platform bank 113 may process a block that might not satisfy the minimum number of rules and/or regulations within the block if platform bank 113 determines that the importance value associated with the rules and/or regulations satisfies the computing platform's preference (e.g., the importance value is 90% or greater).

Alternatively, if platform bank 113 determines that the number of rules and/or regulations in a group (e.g., a group associated with the virtual computing environment mortgage repayment service) meets the minimum number of rules and/or regulations that may be in the block, then platform bank 113 may store the rule and/or regulations in the block. Platform bank 113 may identify a node (e.g., one of nodes 114a-114c) that is associated with the virtual computing environment service and/or virtual computing environment product with which the block may be associated. For example, if the rules and/or regulations within the block are associated with the virtual computing environment mortgage repayment service, then platform bank 113 may identify a node (e.g., node 114a) that corresponds to the virtual computing environment mortgage repayment service. Platform bank 113 may transmit the block to the corresponding node.

Computing platform 110 may further comprise nodes 114a-114c. Each of nodes 114a-114c (referred to herein as "node 114a") may correspond to a different virtual computing environment service and/or virtual computing environment product. While FIG. 1B depicts three nodes within computing platform 110, more or less than three nodes may exist within computing platform 110. Three nodes are depicted in FIG. 1B for illustration purposes and are not meant to be limiting. While reference is made herein to node 114a, it is important to note that any one of nodes 114a-114c may perform the methods and functions described herein.

Node 114a may receive a block from platform bank 113. Node 114a may assign a unique key to each received block. The unique key may indicate the virtual computing environment service and/or virtual computing environment product with which the block may be associated. Each unique key may be associated with a corresponding key. Node 114a may generate the corresponding key that is associated with the unique key associated with the block. For example, if a new virtual computing environment service and/or virtual computing environment product is made available in the virtual computing environment, the node associated with the new virtual computing environment service and/or virtual computing environment product may generate a unique key that may correspond to the node associated with the new virtual computing environment service and/or virtual computing environment product, and may generate a corresponding key that may correspond to the device associated with the new virtual computing environment service and/or virtual computing environment product.

In some instances, node 114a may retrieve the corresponding code form distributed ledger 117. For example, distributed ledger may store the corresponding codes that may be associated with virtual computing environment services and/or virtual computing environment products that may have previously received at least one rule and/or regulation from computing platform 110.

A block may be assigned a unique key that indicates the virtual computing environment service and/or virtual computing environment product that the block may be associated with, and the device associated with the virtual computing environment service and/or virtual computing environment product may be assigned the corresponding key (e.g., to form a key pair). For example, the mortgage repayment virtual computing environment service may be associated with a key pair that may include a unique key that may read "AAA" and a corresponding key that may read "BBB." Node 114a may assign the unique code "AAA" to the block and the device associated with the mortgage repayment virtual computing environment service may be assigned the corresponding code "BBB." Node 114a may transmit the block and the unique key to interference interface platform layer 115.

Interference interface platform layer 115 may establish a connection with virtual computing environment 116 using websocket API 111. In particular, interference interface platform layer 115 may engage computing platform computing device 140 and may use computing platform computing device 140 to launch the web browser, transmit a blank data file, and transmit a request to access virtual computing environment 116 using websocket API 111, as described above. Interference interface platform layer 115 may establish the connection with virtual computing environment 116 using computing platform computing device 140 and websocket API 111.

Interference interface platform layer 115 may receive, from node 114a, the block and the unique key that may be associated with the block. Interference interface platform layer 115 may parse the unique key to identify the virtual computing environment service and/or virtual computing environment product that the block may correspond to. Interference interface platform layer 115 may use the unique key to identify the corresponding key. Interference interface platform layer 115 may transmit the block to the device that may correspond to the virtual computing environment service and/or virtual computing environment product (e.g., devices that may correspond to at least one of virtual computing environment services 116a-116c and/or virtual computing environment products 116d-116f) based on the unique key and the corresponding key.

Virtual computing environment 116 may comprise of a computer-generated rendering of the physical world. Services and products that may be offered for sale in the physical world may be also be offered for sale in a digital space (e.g., in a metaverse). As such, virtual computing environment 116 may comprise a plurality of virtual computing environment services (e.g., virtual computing environment services 116a-116c), a plurality of virtual computing environment products (e.g., virtual computing environment products 116d-116f), or the like. While FIG. 1B depicts three virtual computing environment services and three virtual computing environment products, more or less than three virtual computing environment services and virtual computing environment products may exist within virtual computing environment 116. Three virtual computing environment services and three virtual computing environment products are depicted in FIG. 1B for illustration purposes and are not meant to be limiting.

The rules and/or regulations that govern the services and products that may be offered for sale in the physical world may also govern the virtual computing environment services and virtual computing environment products. Virtual computing environment 116 may receive the at least one rule and/or regulation that may govern the virtual computing environment services and/or virtual computing environment products. In particular, virtual computing environment services (e.g., virtual computing environment services 116a-116c) and/or virtual computing environment products (e.g., virtual computing environment products 116d-1160) may receive, from interference interface platform layer 115, at least one block that may contain rules and/or regulations that may be associated with the virtual computing environment service and/or the virtual computing environment product. The device associated with virtual computing environment services (e.g., virtual computing environment services 116a-116c) and/or virtual computing environment products (e.g., virtual computing environment products 116d-116f) may store the received rules and/or regulations. The device associated with virtual computing environment services (e.g., virtual computing environment services 116a-116c) and/or virtual computing environment products (e.g., virtual computing environment products 116d-116f) may use the received rules and/or regulations for completing future transactions in virtual computing environment 116.

Distributed ledger 117 may store each rule and/or regulation that rulemaking body 130 may transmit to computing platform 110. Distributed ledger 117 may store an importance value associated with each rule and/or regulation that may be processed by computing platform 110, as described above. Distributed ledger 117 may further store indications, generated by tanglegraph 112, that a rule and/or regulation might not be transmitted to platform bank 113 for further processing based on the importance value associated with the rule and/or regulation (e.g., based on determining the rule and/or regulation is associated with a second importance value range). Further, distributed ledger 117 may store the unique code that may be assigned, by node 114a, to each block generated by platform bank 113.

A Distributed Regulatory Tanglegraph Consortium System for Executing Processes in a Virtual Computing Environment FIGS. 2A-2E depict an illustrative event sequence for a distributed regulatory tanglegraph consortium system for executing processes in a virtual computing environment, in accordance with one or more aspects described herein. While aspects described with respect to FIG. 2A to FIG. 3 may include the evaluation of a single rule and/or regulation, a plurality of rules and/or regulations may be received and evaluated (e.g., in parallel) without departing from the present disclosure. Further, the methods described herein may be performed in real-time or near real-time. While FIGS. 2A-2E may depict tanglegraph 112, platform bank 113, node 114a, interference interface platform layer 115, and virtual computing environment 116 as being separate from computing platform 110, it is important to note that tanglegraph 112, platform bank 113, node 114a, interference interface platform layer 115, and virtual computing environment 116 may be part of computing platform 110.

Figure 2A:
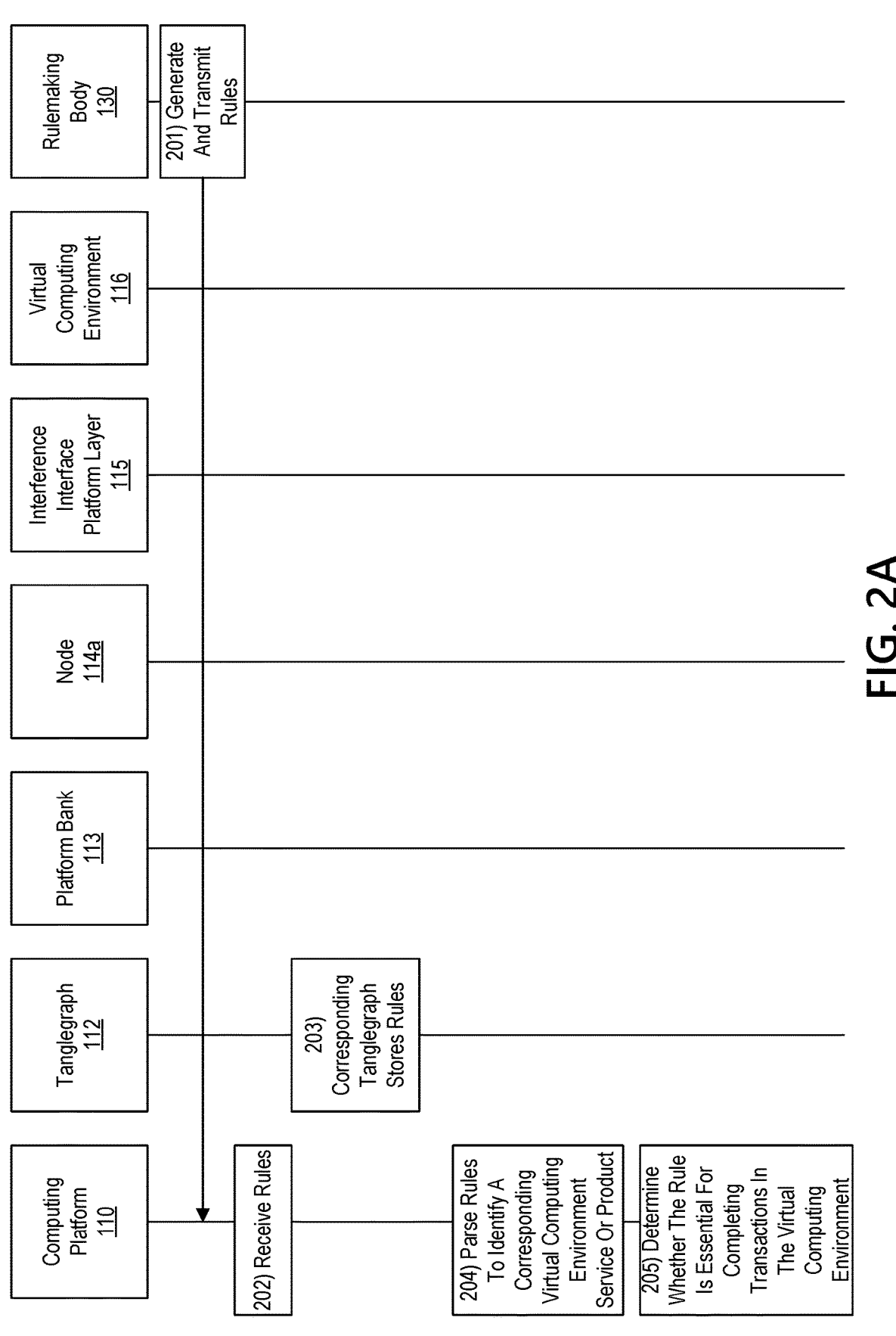
FIGS. 2A-2E depict an illustrative event sequence that may be used in a distributed regulatory tanglegraph consortium system for executing processes in a virtual computing environment, in accordance with one or more example embodiments.

Referring to FIG. 2A, at step 201, rulemaking body 130 may generate (e.g., draft, modify, revise, update, repeal, or the like) rules and/or regulations that may affect an industry. To do so, rulemaking body 130 may monitor a particular industry (e.g., a financial industry, an automotive industry, a factory industry, or the like) to track current rules and/or regulations that may influence (e.g., control, govern, or the like) transactions within the industry. Rulemaking body 130 may monitor an overall atmosphere within the industry to detect when the industry may encounter (or may have encountered) at least one change (e.g., transitioning to cloud computing, removing physical files, streamlining a loan application process, or the like). As such, rulemaking body 130 may respond to the at least one change through the creation of new rules and/or regulations that may address the at least one change. Rulemaking body 130 may transmit the generated rules and/or regulations to computing platform 110 across network 150.

At step 202, computing platform 110 may receive at least one rule and/or regulation from rulemaking body 130. Computing platform 110 may parse the at least one rule and/or regulation using at least one natural language processing (NLP) algorithm (e.g., a supervised machine learning model that may be configured to perform text classification) to identify at least one industry associated with the at least one rule and/or regulation. Computing platform 110 may match the industry identified by the at least one NLP algorithm to a corresponding tanglegraph.

At step 203, the tanglegraph that may correspond to the industry identified by the computing platform 110 (e.g., tanglegraph 112 of computing platform 110) may store the at least one rule and/or regulation in distributed ledger 117.

At step 204, computing platform 110 may parse the at least one rule and/or regulation using at least one natural language processing (NLP) algorithm (e.g., a supervised machine learning model that may be configured to perform text classification) to identify a virtual computing environment service and/or virtual computing environment product that may correspond to the at least one rule and/or regulation. For example, the at least one NLP algorithm may be configured to identify words and/or terms that may indicate an objective (e.g., a goal, a mission, or the like) of the at least one rule and/or regulation (e.g., "three forms of identification are needed for loan application verification" may indicate that the at least one rule and/or regulation may be associated with a virtual computing environment loan application service, "mortgage refinancing options" may indicate that the at least one rule and/or regulation may be associated with a virtual computing environment mortgage repayment service, or the like).

At step 205, computing platform 110 may determine whether the at least one rule and/or regulation may be essential for completing transactions in the virtual computing environment. To do so, computing platform 110 may monitor the procedures (e.g., transactional procedures) that may be executed when completing a transaction with the virtual computing environment service and/or the virtual computing environment product to which that the at least one rule and/or regulation may correspond. Computing platform 110 may determine that the at least one rule and/or regulation may be essential or meet at least the first threshold level of importance for completing transactions in the virtual computing environment if the at least one rule and/or regulation indicates at least one action and/or item that may be required to successfully complete transactions. Alternatively, computing platform 110 may determine that the at least one rule and/or regulation might not be essential (e.g., may be non-essential) or might not meet at least the first threshold of importance for completing transactions in the virtual computing environment if the at least one rule and/or regulation identifies a plurality of options for successfully completing transactions.

Figure 2B:
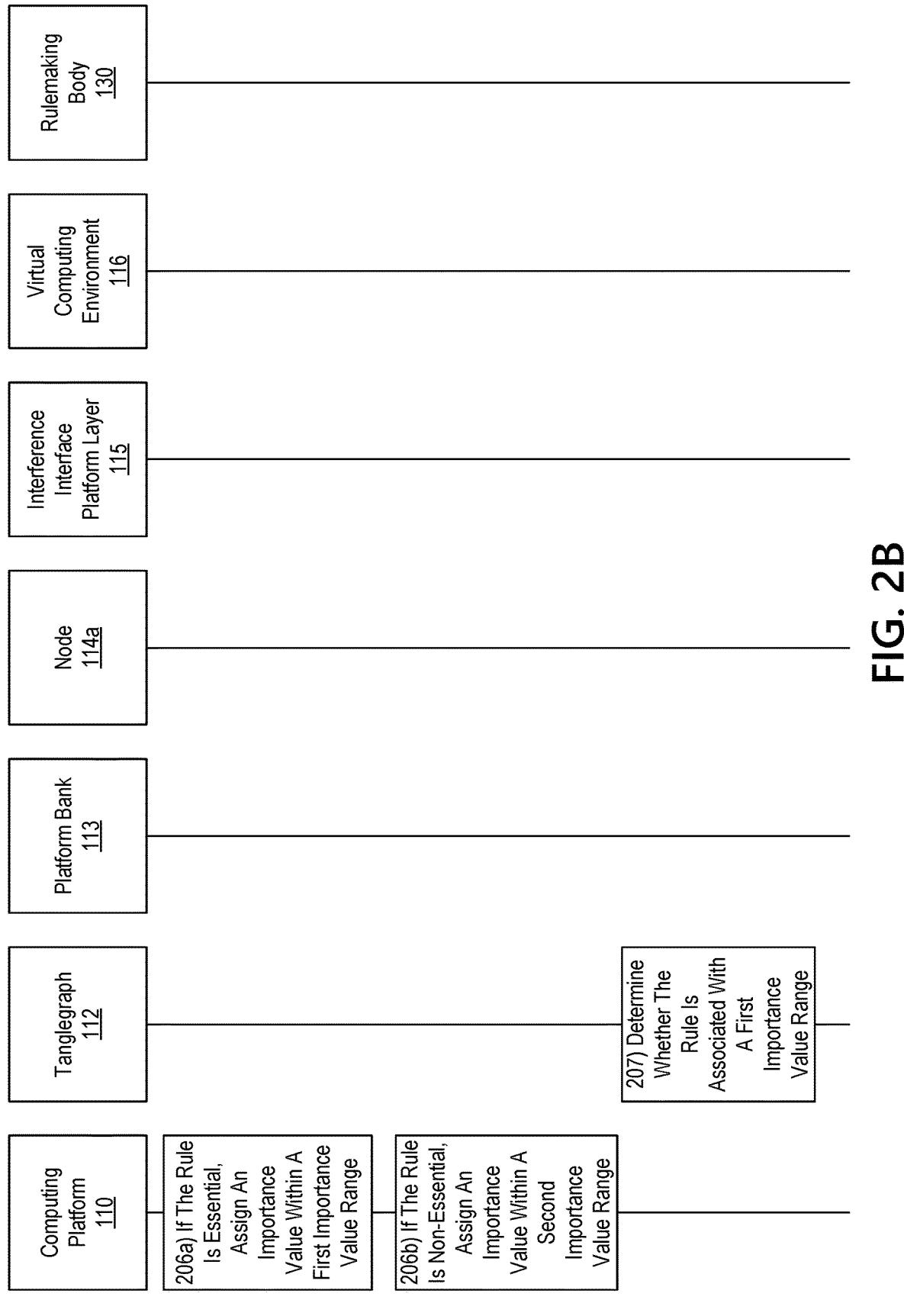

If, at step 205, computing platform 110 determines that the at least one rule and/or regulation may be essential or may meet at least the first threshold level of importance, then, referring to FIG. 2B and at step 206a, computing platform 110 may assign the at least one rule and/or regulation an importance value within a first importance value range (e.g., an importance value that may be equal to or greater than a threshold importance value that may be determined by the computing platform). Computing platform 110 may store the importance value associated with the at least one rule and/or regulation in distributed ledger 117. Alternatively, if at step 205, computing platform 110 determines that the at least one rule and/or regulation might not be essential (e.g., may be non-essential) or might not meet at least the first threshold level of importance, then, at step 206b, computing platform 110 may assign the at least one rule and/or regulation an importance value within a second importance value range (e.g., an importance value that may be less than the threshold importance value that may be determined by the computing platform). Computing platform 110 may store the importance value associated with the at least one rule and/or regulation in distributed ledger 117.

At step 207, tanglegraph 112 may analyze the at least one rule and/or regulation to determine whether the at least one rule and/or regulation may be associated with an importance value within the first importance value range or an importance value within the second importance value range (e.g., determine whether the at least one rule and/or regulation may be essential or may be non-essential based on the importance value associated with the at least one rule and/or regulation). To do so, tanglegraph 112 may retrieve, from distributed ledger 117, the at least one importance value associated with the at least one rule and/or regulation.

Figure 2C:
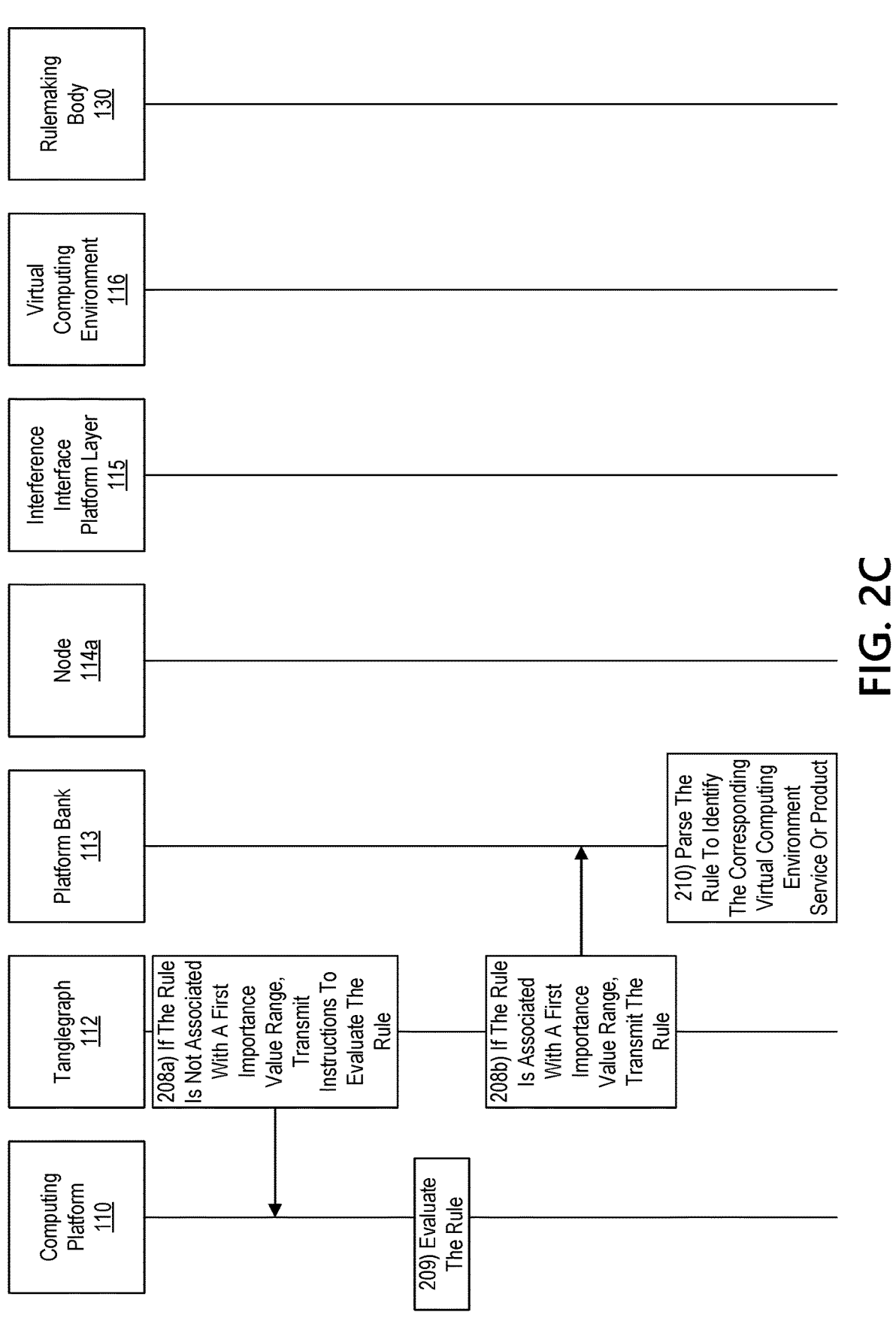

If, at step 207, tanglegraph 112 determines that the at least one rule and/or regulation might not be essential, then, referring to FIG. 2C and at step 208a, tanglegraph 112 may instruct computing platform 110 to evaluate (or re-evaluate) the at least one rule and/or regulation.

At step 209, computing platform 110 may further investigate (e.g., monitor, research, or the like) the transactional procedures that may be associated with the virtual computing environment service and/or the virtual computing environment product to which the rule and/or regulation may correspond. Computing platform 110 may determine whether the transactional procedures that may be associated with the virtual computing environment service and/or virtual computing environment product may have changed (e.g., whether updated transactional procedures indicate that the at least one rule and/or regulation that may have previously been non-essential or not met at least the first threshold level of importance for completing transactions in the virtual computing environment may now be essential or may meet at least the first threshold level of importance for completing transactions in the virtual computing environment). Computing platform 110 may adjust (e.g., increase, decrease) the importance value associated with the at least one rule and/or regulation.

Alternatively, if, at step 207, tanglegraph 112 determines that the at least one rule and/or regulation may be essential (e.g., may be associated with an importance value within the first importance value range), then, at step 208b, tanglegraph 112 may transmit the rule to platform bank 113 of computing platform 110.

At step 210, platform bank 113 may receive, from tanglegraph 112, the at least one rule and/or regulation. Platform bank 113 may parse the at least one rule and/or regulation to identify the virtual computing environment service and/or virtual computing environment product that the at least one rule and/or regulation may affect. Platform bank 113 may use at least one NLP algorithm (e.g., a supervised machine learning model that may be configured to perform text classification) to identify at least one virtual computing environment service and/or virtual computing environment product associated with the at least one rule and/or regulation. For example, the at least one NLP algorithm may be configured to identify words and/or terms that may indicate a virtual computing environment service and/or virtual computing environment product (e.g., "three forms of identification are needed for loan application verification" may indicate that the at least one rule and/or regulation may be associated with a virtual computing environment loan application service).

Figure 2D:
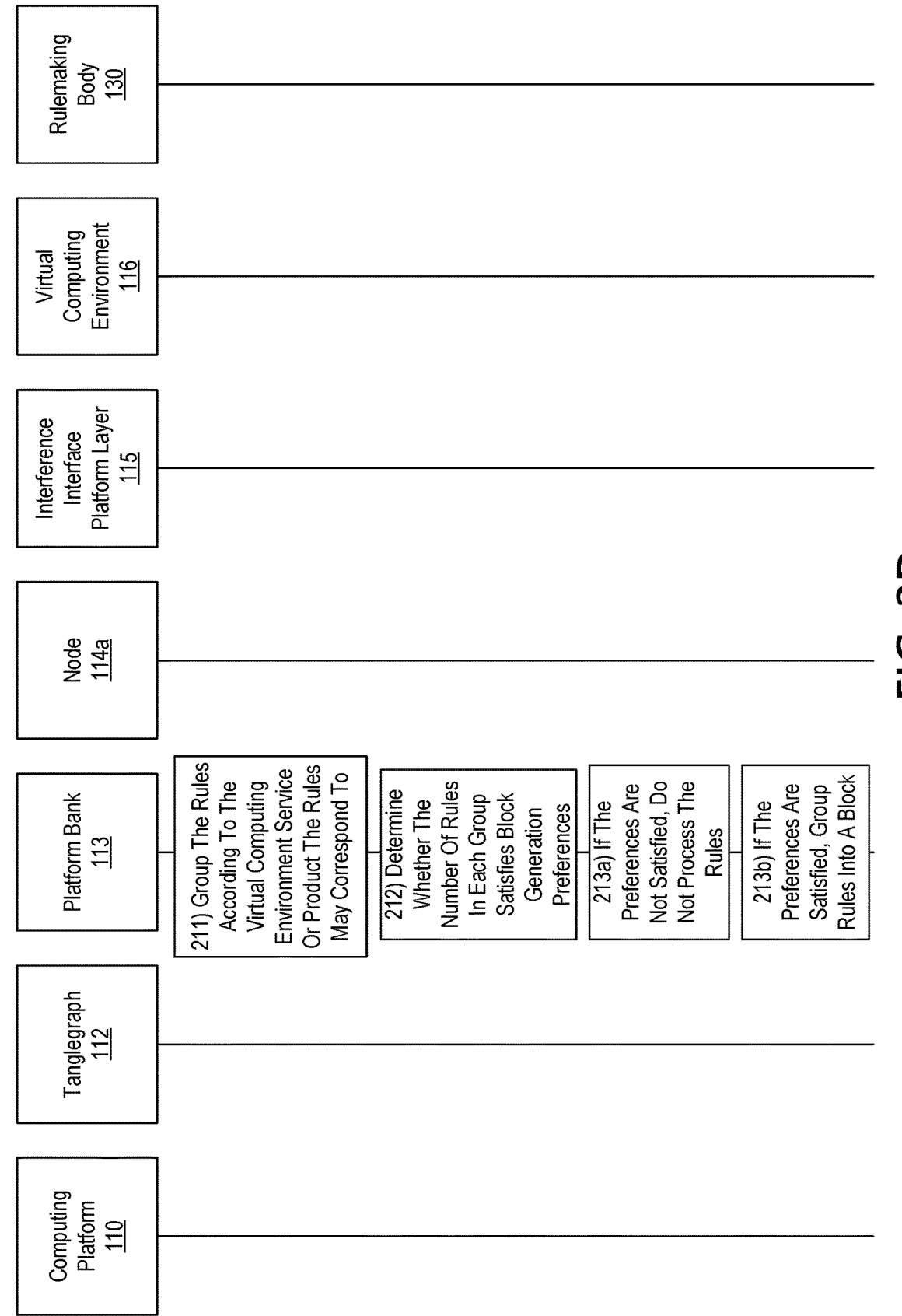

Referring to FIG. 2D, at step 211, platform bank 113 may group the rules and/or regulations based on the virtual computing environment service and/or virtual computing environment product that each rule and/or regulation may affect. For example, the rules and/or regulations that may affect the virtual computing environment loan application service may be grouped separately from the rules and/or regulations that may affect the virtual computing environment mortgage repayment service.

At step 212, platform bank 113 may determine a number of rules and/or regulations that may be stored within a block of rules based on block generation preferences that may be established by computing platform 110. In some instances, computing platform 110 may determine a minimum or a maximum number of rules and/or regulations that may be within the block based on the number of tanglegraphs within computing platform 110. In some instances, computing platform 110 may determine that the minimum and/or the maximum number of rules and/or regulations within the block might not be based on the number of tanglegraphs within computing platform 110, but may be based on the computing platform's preferences. For example, the computing platform's preferences may indicate that rules and/or regulations that may be associated with at least a particular importance value (e.g., an importance value of 90% or greater) may be processed by platform bank 113 without satisfying the minimum number of rules and/or regulations in the block.

If, at step 212, platform bank 113 determines that the number of rules and/or regulations in the group (e.g., a group associated with the virtual computing environment mortgage repayment service) might not satisfy the block generation preferences (e.g., might not meet the minimum number of rules and/or regulations that may be in the block), then, at step 213a, platform bank 113 might not process the rules in the group. In some instances, platform bank 113 may wait until additional rules and/or regulations associated with the virtual computing environment service and/or virtual computing environment product are received, until the additional rules and/or regulations are added to the group, or the like.

Alternatively, if, at step 212, platform bank 113 determines that the number of rules and/or regulations in the group (e.g., the group associated with the virtual computing environment mortgage repayment service) may satisfy the block generation preferences (e.g., may meet the minimum number of rules and/or regulations that may be in the block), then, at step 213b, platform bank 113 may generate at least one block using the at least one rule and/or regulation in the group.

Figure 2E:
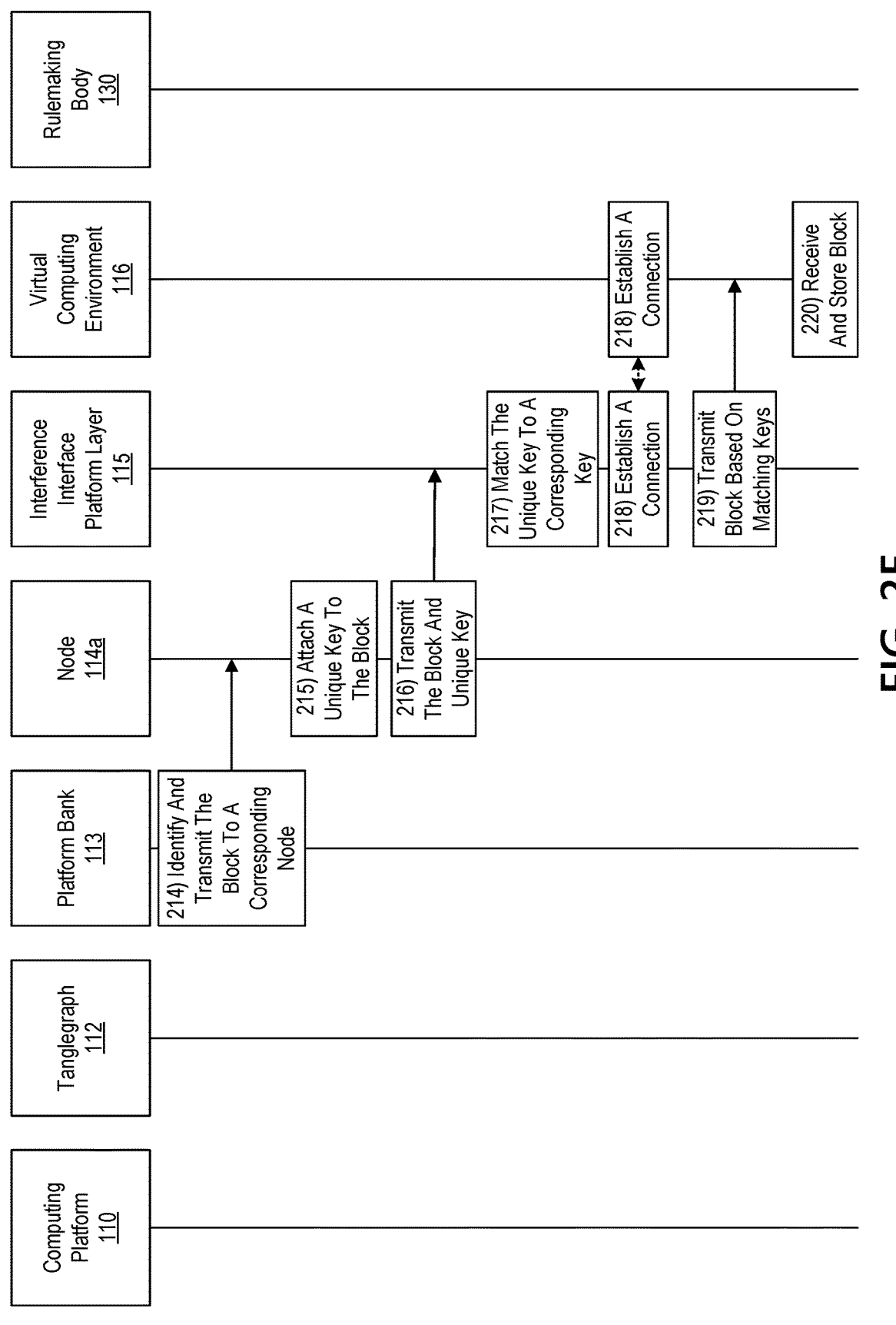

Referring to FIG. 2E, at step 214, platform bank 113 may identify a node (e.g., one of nodes 114a-114c) that may be associated with the virtual computing environment service and/or virtual computing environment product with which the block may be associated. For example, if the rules and/or regulations within the block are associated with the virtual computing environment mortgage repayment service, then platform bank 113 may identify a node (e.g., node 114a) that corresponds to a computing device associated with the virtual computing environment mortgage repayment service. Platform bank 113 may transmit the at least one block to the device associated with the corresponding node.

At step 215, node 114a of computing platform 110 may receive the at least one block from platform bank 113 and may assign a unique key to the at least one block. The unique key may indicate the virtual computing environment service and/or virtual computing environment product with which the block may be associated. Each unique key may be associated with a corresponding key. In particular, a block may be assigned a unique key that indicates the virtual computing environment service and/or virtual computing environment product that the block may be associated with, and the virtual computing environment service and/or virtual computing environment product may be assigned the corresponding key.

At step 216, node 114a may transmit the at least one block and the unique key associated with the at least one block to interference interface platform layer 115 of computing platform 110. At step 217, interference interface platform layer 115 may receive, from node 114a, the at least one block and the unique key that may be associated with the at least one block. Interference interface platform layer 115 may parse the unique key to identify the virtual computing environment service and/or virtual computing environment product to which the at least one block may correspond.

At step 218, interference interface platform layer 115 may establish a connection with virtual computing environment 116 using websocket API 111. In particular, interference interface platform layer 115 may engage computing platform computing device 140 and may use computing platform computing device 140 to launch the web browser, transmit a blank data file, and transmit a request to access virtual computing environment 116 using websocket API 111.

At step 219, interference interface platform layer 115 may transmit the at least one block to the device associated with the virtual computing environment service and/or virtual computing environment product (e.g., the device that may be associated with one of virtual computing environment services 116a-116c and/or virtual computing environment products 116d-116f) based on the unique key and the corresponding key. At step 220, virtual computing environment 116 of computing platform 110 may receive, from interference interface platform layer 115, the at least one block that may contain rules and/or regulations that may be associated with virtual computing environment services (e.g., virtual computing environment services 116a-116c) and/or virtual computing environment products (e.g., virtual computing environment products 116d-116f) Virtual computing environment 116 (e.g., at least one of virtual computing environment services 116a-116c and/or virtual computing environment products 116d-116f) may store the received rules and/or regulations. Virtual computing environment 116 (e.g., at least one of virtual computing environment services 116a-116c and/or virtual computing environment products 116d-116f) may use the received rules and/or regulations for completing transactions in virtual computing environment 116.

Figure 3:
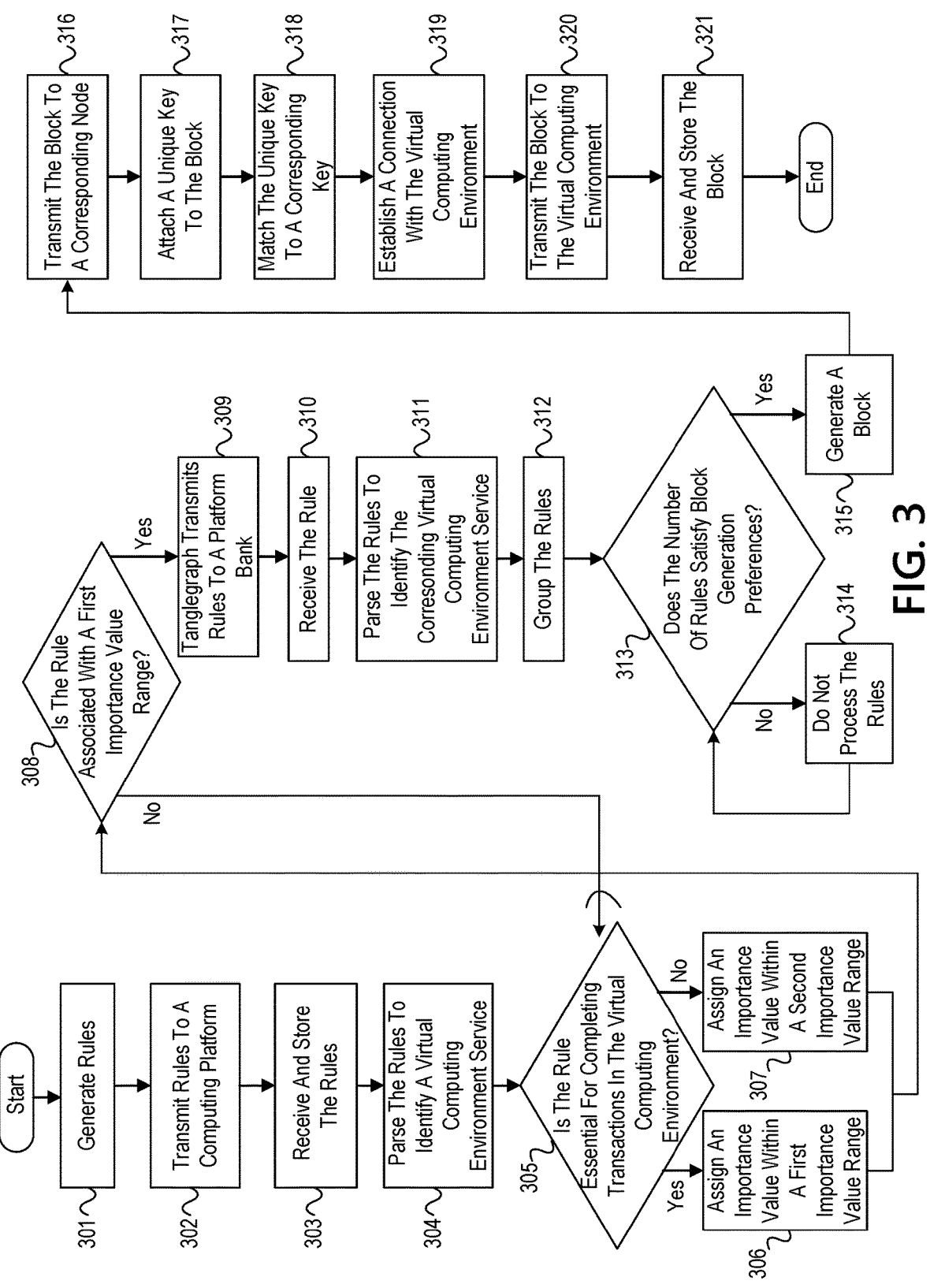
FIG. 3 depicts an illustrative method that may be used in a distributed regulatory tanglegraph consortium system for executing processes in a virtual computing environment, in accordance with one or more example embodiments.

FIG. 3 depicts a flow diagram illustrating one example method in a distributed regulatory tanglegraph consortium system for executing processes in a virtual computing environment, in accordance with the features described herein. The processes illustrated in FIG. 3 are merely sample processes and functions. The steps shown may be performed in the order shown, in a different order, more steps may be added, or one or more steps may be omitted, without departing from the invention. In some examples, one or more steps may be performed simultaneously with other steps shown and described. Further, one or more steps described with respect to FIG. 3 may be performed in real-time or near real-time. The steps shown in FIG. 3 may be performed by a computing platform (e.g., having components performing various functions), one or more computing devices, or the like, associated with a computing platform.

At step 301, rulemaking body 130 may generate (e.g., draft, modify, revise, update, repeal, or the like) rules and/or regulations that may affect an industry. At step 302, rulemaking body 130 may transmit the generated rules and/or regulations to computing platform 110 across network 150.

At step 303, computing platform 110 may receive the at least one rule and/or regulation generated by rulemaking body 130. For instance, tanglegraph 112 of computing platform 110 may store the at least one rule and/or regulation in distributed ledger 117.

At step 304, computing platform 110 may parse the at least one rule and/or regulation using at least one natural language processing (NLP) algorithm (e.g., a supervised machine learning model that may be configured to perform text classification) to identify a virtual computing environment service and/or virtual computing environment product that may correspond to the at least one rule and/or regulation.

At step 305, computing platform 110 may determine whether the at least one rule and/or regulation may be essential or meet at least the first threshold level of importance for completing transactions in the virtual computing environment. To do so, computing platform 110 may monitor the procedures (e.g., transactional procedures) that may be executed when completing a transaction with the virtual computing environment service and/or the virtual computing environment product to which the at least one rule and/or regulation may correspond. Computing platform 110 may determine that the at least one rule and/or regulation may be essential or may meet at least the first threshold level of importance for completing transactions in the virtual computing environment if the at least one rule and/or regulation indicates at least one action and/or item that may be required to successfully complete transactions. Alternatively, computing platform 110 may determine that the at least one rule and/or regulation might not be essential (e.g., may be non-essential) or might not meet at least the first threshold level of importance for completing transactions in the virtual computing environment if the at least one rule and/or regulation identifies a plurality of options for successfully completing transactions.

If, at step 305, computing platform 110 determines that the at least one rule and/or regulation may be essential or may meet at least the first threshold level of importance, then, at step 306, computing platform 110 may assign the at least one rule and/or regulation an importance value within a first importance value range (e.g., an importance value that may be equal to or greater than a threshold importance value that may be determined by the computing platform). Computing platform 110 may store the importance value associated with the at least one rule and/or regulation in distributed ledger 117.

Alternatively, if, at step 305, computing platform 110 determines that the at least one rule and/or regulation might not be essential (e.g., may be non-essential) or might not meet at least the first threshold level of importance, then, at step 307, computing platform 110 may assign the at least one rule and/or regulation an importance value within a second importance value range (e.g., an importance value that may be less than the threshold importance value that may be determined by computing platform 110). Computing platform 110 may store the importance value associated with the at least one rule and/or regulation in distributed ledger 117.

At step 308, computing platform 110 may analyze the at least one rule and/or regulation to determine whether the at least one rule and/or regulation may be associated with an importance value within the first importance value range or an importance value within the second importance value range (e.g., determine whether the at least one rule and/or regulation may be essential or may be non-essential based on the importance value associated with the at least one rule and/or regulation). For instance, tanglegraph 112 of computing platform 110 may analyze the at least one rule and/or regulation to determine whether the at least one rule and/or regulation may be associated with an importance value within the first importance value range or an importance value within the second importance value range (e.g., determine whether the at least one rule and/or regulation may be essential or may be non-essential based on the importance value associated with the at least one rule and/or regulation).

If, at step 308, tanglegraph 112 determines that the at least one rule and/or regulation might not be essential or might not meet at least the first threshold level of importance, then the method described herein may return to step 305 in that computing platform 110 may further investigate (e.g., monitor, research, or the like) the transactional procedures that may be associated with the virtual computing environment service and/or the virtual computing environment product that the rule and/or regulation may correspond to. Computing platform 110 may determine whether the transactional procedures that may be associated with the virtual computing environment service and/or virtual computing environment product may have changed (e.g., whether updated transactional procedures indicate that the at least one rule and/or regulation that may have previously been non-essential or might not have met at least the first threshold level of importance for completing transactions in the virtual computing environment may now be essential or may meet at least the first threshold level of importance for completing transactions in the virtual computing environment). Computing platform 110 may adjust (e.g., increase, decrease) the importance value associated with the at least one rule and/or regulation.

Alternatively, if, at step 308, tanglegraph 112 determines that the at least one rule and/or regulation may be essential (e.g., may be associated with an importance value within the first importance value range), then, at step 309, tanglegraph 112 may transmit the rule to platform bank 113 of computing platform 110. At step 310, platform bank 113 may receive, from tanglegraph 112, the at least one rule and/or regulation.

At step 311, platform bank 113 of computing platform 110 may parse the at least one rule and/or regulation to identify the virtual computing environment service and/or virtual computing environment product that the at least one rule and/or regulation may affect. Platform bank 113 may use at least one NLP algorithm (e.g., a supervised machine learning model that may be configured to perform text classification) to identify at least one virtual computing environment service and/or virtual computing environment product associated with the at least one rule and/or regulation.

At step 312, platform bank 113 may group the rules and/or regulations based on the virtual computing environment service and/or virtual computing environment product that each rule and/or regulation may affect. For example, the rules and/or regulations that may affect the virtual computing environment loan application service may be grouped separately from the rules and/or regulations that may affect the virtual computing environment mortgage repayment service.

At step 313, platform bank 113 may determine a number of rules and/or regulations that may be stored within a block of rules based on block generation preferences that may be established by the computing platform. Platform bank 113 may determine whether the number of rules and/or regulations with the group may satisfy the block generation preferences.

If, at step 313, platform bank 113 determines that the number of rules and/or regulations in the group (e.g., a group associated with the virtual computing environment mortgage repayment service) might not satisfy the block generation preferences (e.g., might not meet the minimum number of rules and/or regulations that may be in the block), then, at step 314, platform bank 113 might not process the rules in the group. In some instances, platform bank 113 may wait until additional rules and/or regulations associated with the virtual computing environment service and/or virtual computing environment product are received, until the additional rules and/or regulations are added to the group, or the like.

In some instances, the method described herein may return to step 313 to if additional rules are received and are added to the group.

If, at step 313, platform bank 113 determines that the number of rules and/or regulations in the group (e.g., the group associated with the virtual computing environment mortgage repayment service) may satisfy the block generation preferences (e.g., may meet the minimum number of rules and/or regulations that may be in the block), then, at step 315, platform bank 113 may generate at least one block using the at least one rule and/or regulation in the group.

At step 316, platform bank 113 may identify a node (e.g., one of nodes 114a-114c) that may be associated with the virtual computing environment service and/or virtual computing environment product that the block may also be associated with. Platform bank 113 may transmit the at least one block to the corresponding node.

At step 317, node 114a may receive the at least one block from platform bank 113 and may assign a unique key to the at least one block. The unique key may indicate the virtual computing environment service and/or virtual computing environment product that the block may be associated with. Each unique key may be associated with a corresponding key that may be associated with the virtual computing environment service and/or virtual computing environment product that the block may be associated with. Node 114a may transmit the at least one block and the unique key associated with the at least one block to interference interface platform layer 115.

At step 318, interference interface platform layer 115 may receive, from node 114a, the at least one block and the unique key that may be associated with the at least one block. Interference interface platform layer 115 may parse the unique code to identify the virtual computing environment service and/or virtual computing environment product that the at least one block may correspond to.

At step 319, interference interface platform layer 115 may establish a connection with virtual computing environment 116 using websocket API 111 and computing platform computing device 140. At step 320, interference interface platform layer 115 may transmit the at least one block to the device that be associated with the virtual computing environment service and/or virtual computing environment product (e.g., the device that may be associated with one of virtual computing environment services 116a-116c and/or virtual computing environment products 116d-1160 based on the unique key and the corresponding key. At step 321, the device associated with virtual computing environment 116 may receive, from interference interface platform layer 115, the at least one block that may contain rules and/or regulations that may be associated with virtual computing environment services (e.g., virtual computing environment services 116a-116c) and/or virtual computing environment products (e.g., virtual computing environment products 116d-116f) The device that may be associated with virtual computing environment 116 (e.g., the device that may be associated with at least one of virtual computing environment services 116a-116c and/or virtual computing environment products 116d-116f) may store the received rules and/or regulations. The device that may be associated with virtual computing environment 116 (e.g., the device that may be associated with at least one of virtual computing environment services 116a-116c and/or virtual computing environment products 116d-1160 may use the received rules and/or regulations for completing transactions in virtual computing environment 116.

As a result, the proposed solution may provide the following benefits: 1) real-time or near real-time transmission of industry rules and/or regulations to the virtual computing environment; 2) real time, or near real time, access to industry rules and/or regulations through the virtual computing environment; and 3) real time, or near real time analysis of industry rules and/or regulations.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an enterprise computing platform, or as one or more non-transitory computer-readable media storing instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space).

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
at a computing device including at least one processor and memory:
  receiving, by the at least one processor, a rule associated with a virtual computing environment service;
  identifying, by the at least one processor and based on executing a supervised machine learning model configured to perform text classification, an industry associated with the rule;
  determining, by the at least one processor, an importance value associated with the rule, wherein determining the importance value includes:
    monitoring a node associated with the virtual computing environment service;
    determining, based on the monitoring, whether the virtual computing environment service implemented the rule; and
    responsive to determining that the virtual computing environment service implemented the rule, adjusting the importance value from a first importance value to a second importance value;
  identifying, by the at least one processor and based on the identified industry, a tanglegraph of a plurality of tanglegraphs, wherein the tanglegraph includes a lightweight data structure to process rule data based on one or more parameters identified by the computing device;
  processing, by the at least one processor and using the tanglegraph, the rule based on the second importance value associated with the rule;
  based on the determining the rule is associated with a first importance value range, generating, by the at least one processor, a block wherein the block is comprised of a plurality of rules;
  transmitting, by the at least one processor, the block to a node that corresponds to the virtual computing environment service;
  assigning, by the at least one processor, a unique key to the block;
  establishing, by the at least one processor and via a websocket application programming interface (API), a connection with a virtual computing environment including a virtual computing environment service device;
  matching, by the at least one processor, the unique key associated with the block to a corresponding key associated with the virtual computing environment service device; and
  transmitting, based on the matching and using the connection, the block to the virtual computing environment service device in the virtual computing environment.

2. The method of claim 1, further comprising:
determining, by the at least one processor, the rule is essential for completing transactions associated with the virtual computing environment service; and assigning, based on the determining the rule is essential, the first importance value within the first importance value range to the rule.

3. The method of claim 1, further comprising:
determining, by the at least one processor, the rule is non-essential for completing transactions associated with the virtual computing environment service; and
assigning, based on the determining the rule is non-essential, the first importance value within a second importance value range to the rule.

4. The method of claim 1, wherein the transmitting the block to the node further comprises determining, by the at least one processor, a number of rules within the plurality of rules corresponds to a number of tanglegraphs.

5. The method of claim 1, further comprising:
determining, by the at least one processor, a number of rules within the plurality of rules does not correspond to a number of tanglegraphs;
determining, by the at least one processor, whether additional rules correspond to the virtual computing environment service; and
based on determining, by the at least one processor, the additional rules correspond to the virtual computing environment service, adding the additional rules to the block.

6. A computing platform comprising:
at least one processor;
a communication interface communicatively coupled to the at least one processor; and
memory storing computer-readable instructions that, when executed by the at least one processor, cause the computing platform to:
receive a rule associated with a virtual computing environment service;
identify, based on executing a supervised machine learning model configured to perform text classification, an industry associated with the rule;
determine an importance value associated with the rule, wherein determining the importance value includes:
monitoring a node associated with the virtual computing environment service;
determining, based on the monitoring, whether the virtual computing environment service implemented the rule; and
responsive to determining that the virtual computing environment service implemented the rule, adjusting the importance value from a first importance value to a second importance value;
identify, based on the identified industry, a tanglegraph of a plurality of tanglegraphs, wherein the tanglegraph includes a lightweight data structure to process rule data based on one or more parameters identified by the computing platform;
process, using the tanglegraph, the rule based on the second importance value associated with the rule;
based on the determining the rule is associated with a first importance value range, generate a block wherein the block is comprised of a plurality of rules;
transmit the block to a node that corresponds to the virtual computing environment service;
assign a unique key to the block;
establish, via a websocket application programming interface (API), a connection with a virtual computing environment including a virtual computing environment service device;

match the unique key associated with the block to a corresponding key associated with the virtual computing environment service device; and
transmit, based on the matching and using the connection, the block to the virtual computing environment service device in the virtual computing environment.

7. The computing platform of claim 6, wherein the instructions, when executed, further cause the computing platform to:
determine the rule is essential for completing transactions associated with the virtual computing environment service; and
assign, based on the determining the rule is essential, the first importance value within the first importance value range to the rule.

8. The computing platform of claim 6, wherein the instructions, when executed, further cause the computing platform to:
determine the rule is non-essential for completing transactions associated with the virtual computing environment service; and
assign, based on the determining the rule is non-essential, the first importance value within a second importance value range to the rule.

9. The computing platform of claim 6, wherein the transmitting the block to the node further comprises determining a number of rules within the plurality of rules corresponds to a number of tanglegraphs.

10. The computing platform of claim 6, wherein the instructions, when executed, further cause the computing platform to:
determine a number of rules within the plurality of rules does not correspond to a number of tanglegraphs;
determine whether additional rules correspond to the virtual computing environment service; and
based on determining the additional rules correspond to the virtual computing environment service, add the additional rules to the block.

11. One or more non-transitory computer-readable media storing instructions that, when executed by a computing platform comprising at least one processor, memory, and a communication interface, cause the computing platform to:
receive a rule associated with a virtual computing environment service;
identify, based on executing a supervised machine learning model configured to perform text classification, an industry associated with the rule;
determine an importance value associated with the rule, wherein determining the importance value includes:
monitoring a node associated with the virtual computing environment service;
determining, based on the monitoring, whether the virtual computing environment service implemented the rule; and
responsive to determining that the virtual computing environment service implemented the rule, adjusting the importance value from a first importance value to a second importance value;
identify, based on the identified industry, a tanglegraph of a plurality of tanglegraphs, wherein the tanglegraph includes a lightweight data structure to process rule data based on one or more parameters identified by the computing platform;
process, using the tanglegraph, the rule based on the second importance value associated with the rule;

based on the determining the rule is associated with a first importance value range, generate a block wherein the block is comprised of a plurality of rules;

transmit the block to a node that corresponds to the virtual computing environment service;

assign a unique key to the block;

establish, via a websocket application programming interface (API), a connection with a virtual computing environment including a virtual computing environment service device;

match the unique key associated with the block to a corresponding key associated with the virtual computing environment service device; and transmit, based on the matching and using the connection, the block to the virtual computing environment service device in the virtual computing environment.

12. The one or more non-transitory computer-readable media of claim 11, wherein the instructions, when executed, further cause the computing platform to:

determine the rule is essential for completing transactions associated with the virtual computing environment service; and

assign, based on the determining the rule is essential, the first importance value within the first importance value range to the rule.

13. The one or more non-transitory computer-readable media of claim 11, wherein the instructions, when executed, further cause the computing platform to:

determine the rule is non-essential for completing transactions associated with the virtual computing environment service; and assign, based on the determining the rule is non-essential, the first importance value within a second importance value range to the rule.

14. The one or more non-transitory computer-readable media of claim 11, wherein the instructions, when executed, further cause the computing platform to:

determine a number of rules within the plurality of rules does not correspond to a number of tanglegraphs;

determine whether additional rules correspond to the virtual computing environment service; and based on determining the additional rules correspond to the virtual computing environment service, add the additional rules to the block.

* * * * *